United States Patent [19]

Mizuta

[11] Patent Number: 4,696,087
[45] Date of Patent: Sep. 29, 1987

[54] MAGNETIC TAPE CASSETTE ASSEMBLING METHOD AND APPARATUS

[75] Inventor: Akira Mizuta, Kanagawa, Japan

[73] Assignee: Fuji Photo Film Co., Ltd., Kanagawa, Japan

[21] Appl. No.: 899,359

[22] Filed: Aug. 22, 1986

[30] Foreign Application Priority Data

Sep. 5, 1985 [JP] Japan .................. 60-194745

[51] Int. Cl.$^4$ .................. B23P 11/00; B23P 19/00
[52] U.S. Cl. .................. 29/434; 29/33 K; 29/464; 29/700
[58] Field of Search .................. 29/33 K, 428, 434, 462, 29/464, 469, 700, 705

[56] References Cited

U.S. PATENT DOCUMENTS 4,114,252  9/1978  Kon et al. .................. 29/705 X
4,330,925  5/1982  Kato et al. .................. 29/464

FOREIGN PATENT DOCUMENTS 2801941  8/1978  Fed. Rep. of Germany ........ 29/428
19591    5/1985  Japan .

*Primary Examiner*—Howard N. Goldberg
*Assistant Examiner*—Ronald S. Wallace
*Attorney, Agent, or Firm*—Sughrue, Mion, Zinn, Macpeak, and Seas

[57] ABSTRACT

A method and apparatus for assembling a front guard panel having two inwardly projecting shafts on rearwardly facing end pieces into two corresponding holes of a half case. The farther hole is open. The guard panel is placed on table which moves linearly with respect to the half case and is inclined with respect to the front of the half case. The linear movement places the near shaft adjacent the near hole. Then the guard panel is rotated about an axis near the near hole so as to insert the near shaft into the near hole and to move the far shaft into the far hole.

6 Claims, 8 Drawing Figures

X = 26 mm    H = 25 mm
Y = 21 mm    L = 188 mm
Z = 5 mm

MAGNETIC TAPE CASSETTE ASSEMBLING METHOD AND APPARATUS

BACKGROUND OF THE INVENTION

1. Field of the Invention

This invention relates to magnetic tape cassettes, and more particularly to a method of assembling a VHS system video tape cassette.

2. Background Art

In general, a VHS system or BETA system video tape cassette has a guard panel for opening and closing the opening through which the tape is drawn, which opening is formed in the front part of the cassette. The guard panel has supporting shafts at its right and left end pieces so that the guard panel is swingable about the supporting shafts. More specifically, the guard panel is substantially U-shaped, and can swing about the supporting shafts which are pivotally engaged with the side walls of the cassette. In the VHS system video tape cassette, one of the supporting shafts is engaged with an integral hole formed in the upper case half, the other supporting shaft is engaged and inserted into a segmented hole formed between the upper and lower case halves when they are joined.

Accordingly, in assembling the VHS system tape cassette, the one supporting shaft (hereinafter referred to as "a first supporting shaft") must be inserted into the integral hole of the upper half case. Accordingly, the guard panel cannot be combined with the upper case half simply by moving it towards the upper case half in such a manner that it is in parallel with the upper case half. Therefore, this assembling work must be done manually. At a minimum, it has been impossible to completely automate the assembling work. Accordingly, in the step of combining the guard panel with the upper case half, for instance the guard panel is inclined with respect to the upper case half so that the first supporting shaft is inserted into the integral hole, and then the guard panel is swung to cause the second supporting shaft to fall into upper case half part of the segmented hole. In this operation, the mechanism for pushing rubs the guard panel, with the result that scratches are liable to be formed on the guard panel. This difficulty may be eliminated by a method of bonding a relatively soft material such as a piece of cloth or tape to the pushing mechanism. However, the relatively soft material may come off the pushing mechanism when it is used for a long period. That is, it is low in durability.

SUMMARY OF THE INVENTION

An object of this invention is to eliminate the above-described difficulties.

More specifically, an object of this invention is to provide a magnetic tape cassette assembling method in which the guard panel can be quickly and positively combined with the upper half case without damaging the guard panel.

A further object is to provide an apparatus for practicing the method.

The foregoing object and other objects of the invention have been achieved by the following method and apparatus. That is, the invention provides a method of assembling a magnetic tape cassette comprising a substantially L-shaped guard panel which has first and second supporting shafts formed respectively at both of its end pieces and is adapted to cover an opening formed in the front part of the magnetic tape cassette. First and second supporting shafts are inserted into an integral first hole formed in the upper half case and into a segmented second hole formed by the upper and lower half case. According to the invention, the guard panel is inclined with respect to the upper half case substantially in the same plane in such a manner that the first supporting shaft is set beside the integral hole while the second supporting shaft is set forwardly of the segmented hole. The guard panel and/or the upper half case are moved substantially in the longitudinal direction of the upper half case so that a pushing mechanism regulates the position of the guard panel to cause the first supporting shaft to confront with the integral hole. The guard panel is then swung by the pushing mechanism so that the second supporting shaft is engaged with part of the segmented hole while the first supporting shaft is inserted into the integral hole.

The invention also provides an apparatus for practicing the above-described method. That is, the apparatus assembles a magnetic tape cassette comprising a substantially L-shaped guard panel which has first and second supporting shafts formed respectively at both of its end pieces and is adapted to cover an opening formed in the front part of the magnetic tape cassette. The first and second supporting shaft are inserted respectively into the integral hole formed in the upper half case and the segmented hole formed by the upper and lower half cases. According to the invention, the apparatus comprises a first table for holding the upper half case and a second table for holding the guard panel. The first and second tables are adjacent to each other substantially in the same plane. The second table has a rotatable pushing mechanism which is adapted to embrace at least the corner of a guard panel which confronts with the first hole and has regulating surfaces which are inclined at predetermined angles with respect to the longitudinal direction of the upper half case. The first table and/or said second table are movable substantially in parallel with the longitudinal direction of the upper half case, so that, after the first table and/or the second table is moved to allow the first supporting shaft to confront with the integral hole, the pushing mechanism is turned while pushing the guard panel, to thus combine the guard panel with the upper half case.

DETAILED DESCRIPTION OF THE PREFERRED EMBODIMENTS

A magnetic tape cassette assembling method according to the invention, and a first example of a magnetic tape cassette assembling apparatus according to the method will be described in detail.

Figure 1:
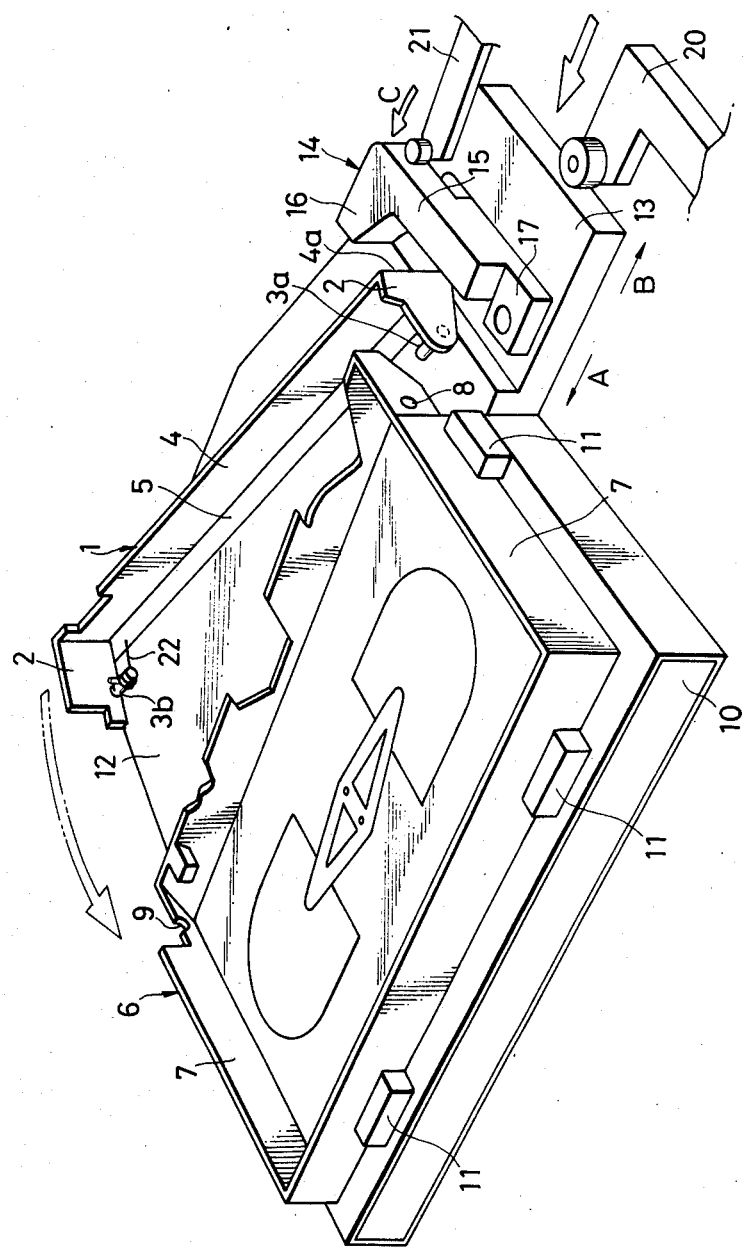
FIG. 1 is a perspective view of a first example of a magnetic tape cassette assembling apparatus according to this invention.

The assembling apparatus is as shown in FIG. 1. That is, the apparatus is used to combine a guard panel 1 with an upper half case of a tape cassette of the VHS system. The apparatus has a first table 10 for fixedly holding the upper half case 6, and a second table 12 adjacent to the first table 10. The second table 12 is so designed that its surface for holding the guard panel 1 is substantially flush with the first table 10 and it is movable substantially in parallel within the lateral directions of the upper half case (in the directions of the arrows A and B). The second table 12 has a rotatable combining metal part 14 which is a pushing means for controlling the position of the guard panel 1 and for turning the guard panel 1 so as to be combined with the upper half case 6.

The first table 10 is so designed that it allows the upper half case 6 to lie on its back (top), and has protrusion 11 for holding, for instance, the rear side and the right and left side of the case 6. The combining metal part 14 of the second table 12 is positioned beside a first integral hole 8 which is formed in the front part of the side wall 7 of the upper half case 6, and it is mounted on a step 13 which is lower in level than the table surface of the second table 12 on which the guard panel 1 is placed. That is, when the second table 12 is moved in the direction of the arrow A in FIG. 1, the fulcrum of rotation of the combining metal part 14 comes below and near the first hole 8.

Figure 3:
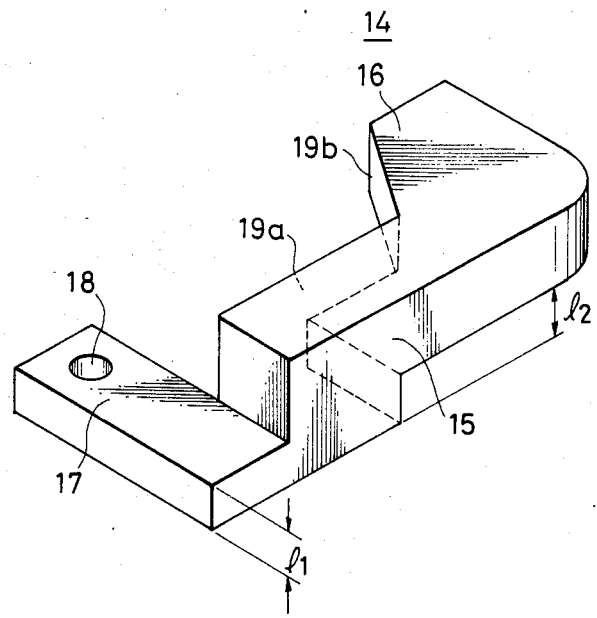
FIGS. 3 and 4 are respectively an enlarged perspective view and a plan view showing essential components of the assembling apparatus of FIG. 1.
Figure 4:
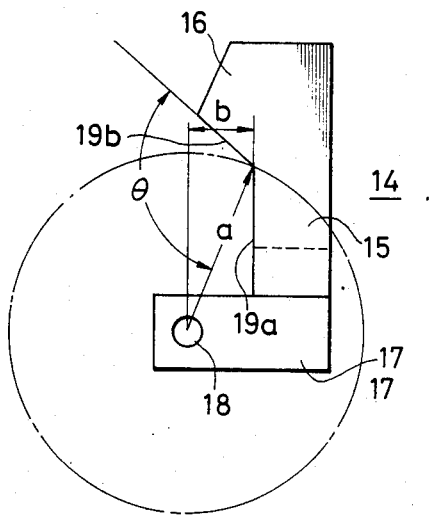

As shown in FIG. 3, the combining metal part 14 has a body 15 with an end portion 16 sloping away from the first table 10 and a mounting portion 17. Both the end portion 16 and the mounting portion 17 extend in the same direction away from the body 15. The combining metal part 14 is substantially U-shaped as viewed from above (cf. FIG. 4). The mounting portion 17 is like a step formed below the body 15, and its thickness ($l_1$) is substantially equal to or smaller than the difference in height between the main surface of the second table 12 and the step 13 of the second table 12. Also, the position of a hole 18 into which a supporting shaft (such as a mounting pin) is inserted; i.e., the position of the center of rotation, is close to the end of the mounting portion 17. The sloping end portion 16 has a regulating surface 19b on the side of the mounting portion 17. The regulating surface 19b forms a predetermined angle with the direction which is perpendicular to the longitudinal direction of the body 15, that is, the angle $\theta$ with respect to the line connecting the hole 18 and the base of protrusion of the end portion 16, as shown in FIG. 4.

Figure 6:
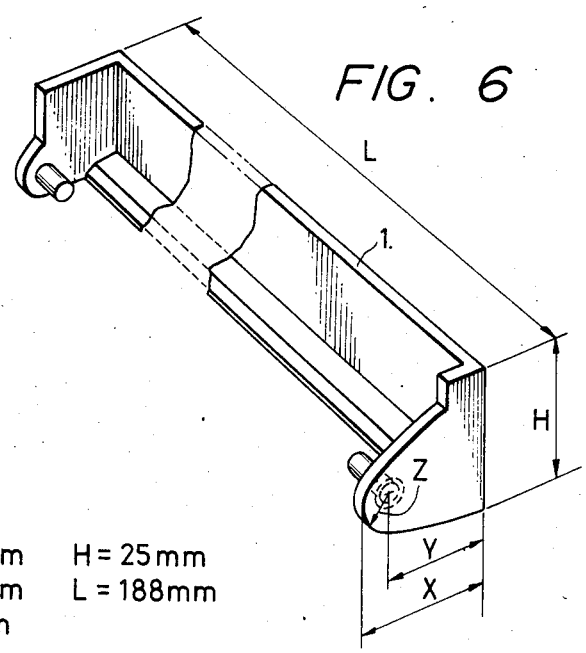
FIG. 6 is a perspective view of the guard panel of a magnetic tape cassette assembling apparatus.

The dimensions of the combining metal part 14 can be determined according to the dimensions of the guard panel 1. The dimensions of a typical guard panel 1 are shown in FIG. 6. For instance, as shown in FIG. 4 for the guard panel of FIG. 6, the distance (radius a) between the center of rotation and the base of protrusion of the end portion 16 is in a range of 20 mm to 32 mm, preferably 26 mm. The distance b between the center of rotation and a regulating surface 19a of the body 15 is in a range of from 5 mm to 15 mm, preferably about 10 mm; and the angle $\theta$ is in a range of from 95° to 110°, preferably about 100°.

For instance a screw is inserted into the hole 18 so that the combining metal part 14 is rotatable about the screw. As the combining metal part 14 is turned about the screw, the end portion 16 is slid on the surface of the second table 12 on which the guard panel is placed. That is, the combining metal part 14 is so designed that there is a clearance between the lower surface of the end portion 16 and the step 13. The clearance ($l_2$) is larger than the difference in height of the panel placing surface and the step 13 of the second table 12.

Now, the operation of the assembling apparatus will be described.

First, the upper half case 6 is fixedly held on the first table 10 in such a manner that it lies on its back. Similarly, the guard panel 1 is placed on the second table 12 in such a manner that it lies on its back. In this case, the guard panel 1 is so positioned that its front wall 4 forms an angle of 10° to 20°, preferably about 15°, with the longitudinal (lateral) direction of the upper half case 6. Its near end piece 2 is positioned between the combining metal part 14 and a side wall 7 of the upper half case (FIG. 2(A)). Under this condition, the second table 12 is slid for a predetermined distance in the direction of the arrow A by a first lever 20 which is operated by an external driving means (FIG. 2(B)). The direction of sliding of the second table 12 is substantially in parallel with the longitudinal (right-to-left) direction of the upper half case. However, strictly stated, it is preferable that the direction of sliding forms about 10° with respect to the first table 10.

As the second table 12 is slid as described above, the regulating surface 19a, inclined with respect to the direction of sliding of the second table 21, or the regulating surface 19a of the body 15 contacts and moves the guard panel 1 until the first supporting shaft 3a is inclined with respect to the first integral hole 8. In this case, it is not always necessary to place the first supporting shaft 3a of the guard panel 1 beside the integral hole 8. That is, if the near end piece 2 of the guard panel 1 is placed in the region (S) indicated by the oblique lines in FIG. 2(A), then a corner 4a of the guard panel 1 is pushed by the regulating surface 19b or 19a of the combining metal part 14 and the inside of the guard panel is regulated in position by the near side wall 7 of the upper half case 6, so that the first supporting shaft 3a accurately confronts the integral hole 8 (cf. FIG. 2 (B)). Under this condition, the center of rotation of the combining metal part 14 is located below the end portion of the near end piece 2.

Figure 2A:
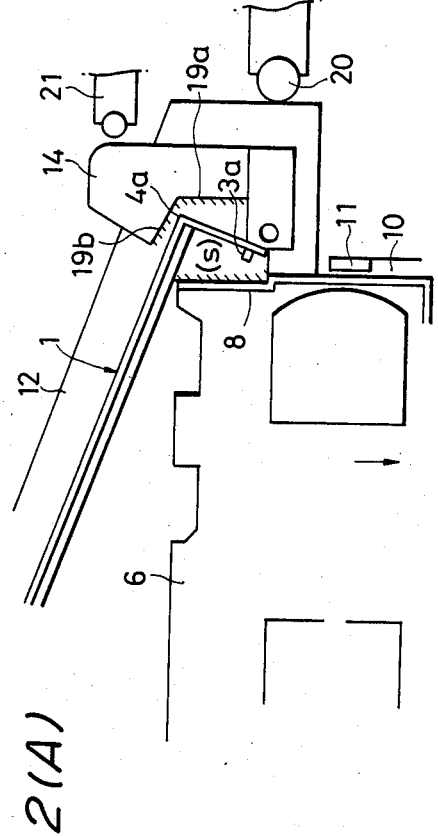
FIGS. 2(A), (B) and (C) are plan views for a description of the operation of the assembling apparatus illustrated in FIG. 1.
Figure 2C:
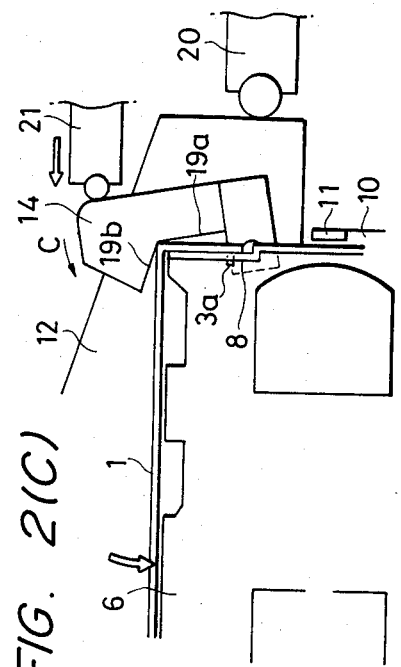
Figure 2B:
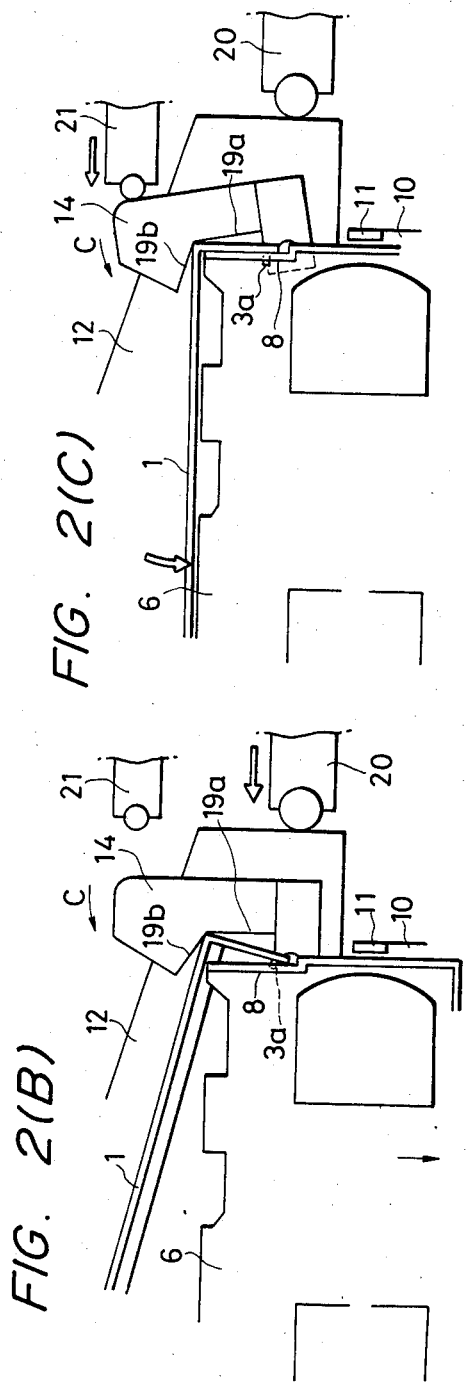

After the first table 10 is slid, the combining metal part 14 is turned through a predetermined angle in the direction of the arrow C (cf. FIGS. 2(A) and (B)). That is, a second lever 21 operated by an external drive force pushes the rear side of the end portion 16 of the combining metal part 14 to rotate the combining metal part 14 as described above. As the combining metal part 14 is turned in this manner, the corner 4a of the guard panel 1 is pushed. That is, the guard panel 1 is swung counter-clockwise with the shaft 3a of the near end piece 2 engaging the integral hole 8 as the fulcrum until the second supporting shaft 3b on the far end piece 2 is engaged with the lower half of the segmented hole 9 which is formed between the upper and lower half case (FIG. 2, (C)).

A torsion spring is coupled to the second supporting shaft 3b to bias the guard panel 1 so that the guard panel 1 remains closed. Therefore, when the second supporting shaft 3b is engaged with the segmented hole 9, the upper wall 5 of the guard panel 1, that is, the wall extending from a front wall 4 toward the back of the cassette is positioned below and outside the case in a position below the front edge portion of the inverted upper half case 6 while one end of the torsion spring 22 pushes the upper side (inside the case) of the front edge portion. Thus, the second supporting shaft 3b is positively held in the segmented hole 9. As the guard panel 1 is rotated in the direction of the arrow C, the first supporting shaft 3a is positively engaged with the integral hole 8. Thus, the guard panel 1 has been positively coupled to the upper half case 6.

The guard panel 1 is swung by the combining metal part 14, as was described above. In this connection, it should be noted that the axis of rotation of the guard panel 1 occuring near the tip of the near end piece 2 coincides with the axis of rotation of the combining metal part 14. Therefore, when the panel is swung, the regulating surfaces 19a and 19b are not rubbed by the corner 4a. That is, no scratches are formed on the panel when the panel is swung by the combining metal part 14.

While the assembly of the upper half case 6 together with the guard panel 1 as described above is delivered to the following assembling station, the assembling apparatus becomes ready for combining the next upper half case with the next guard panel. That is, the assembling apparatus is so designed that it can successively perform the assembly work. More specifically, before the assembly of the upper half case and the guard panel is removed from the apparatus, the combining metal part 14 is turned in the direction opposite to the direction of the arrow C. Substantially simultaneously when the assembly is removed, preferably immediately after removal of the assembly, the second table 12 is returned to its original position. If energizing means such as springs are utilized to maintain the second table 12 and the combining metal part 14 to be biased in the directions opposite to the directions in which they are moved to combine the upper half case and the guard panel together, then they are automatically returned to their original position when the levers 20 and 21 are released.

As is apparent from the above description, with the assembling apparatus, the assembly work of the upper half case 6 and the guard panel 1 can be performed successively, quickly and positively.

Figure 5:
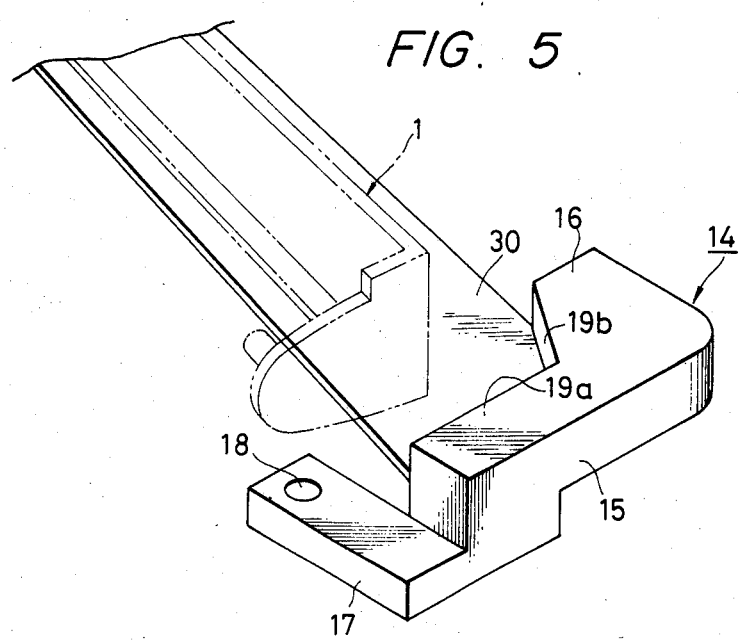
FIG. 5 is an enlarged perspective view showing essential components of a second example of the assembling apparatus according to the invention.

In the above-described embodiment, when the guard panel 1 is swung in the direction of the arrow C, the upper wall 5 of the guard panel 1 rubs the second table 12. Accordingly the upper wall 5 may be scratched by the second table 12. This difficulty may be eliminated by bonding a relatively soft material such as a piece of cloth to the surface of the second table 12. Alternatively, the second table 12 may be inclined downwardly two or three degrees toward the first table 10 so that the guard panel 1 may not be scratched by the second table 12 when swung. For instance, the assembling apparatus may be designed as shown in FIG. 5. The assembling apparatus of FIG. 5 is substantially the same in construction as the above-described one. However, the two apparatus differ in the combining metal part 14. That is, the combining metal part 14 of FIG. 5 has a plate 30 adapted to hold the guard panel 1 and to slide on the second table 12. That is, the combining metal part 14 swings with the guard panel 1 held on the plate 30, and therefore the guard panel 1 will never be scratched by the second table 12. The apparatus of FIG. 5 is free from the problem of durability and excellent in maintenance when compared with the apparatus having the second table covered with the relatively soft material such as a piece of cloth.

The assembling apparatus described above is so designed that the second table 12 is moved. However, the assembling apparatus according to the method of the invention is not limited thereto or thereby. That is, the assembling apparatus may be so designed that the first table 10 is moved, or both of the first and second tables 10 and 12 are moved.

As was described above, according to the assembling method of the invention and the assembling apparatus for practicing the assembling method, owing to the regulating surfaces 19a and 19b of the pushing means, the guard panel 1 and the upper half case 6 can be initially positioned merely by moving the table holding the cassette components in parallel, and the upper half case 6 and the guard panel 1 can be combined together by turning the pushing means. Therefore, the upper half case and the guard panel can be assembled together quickly when compared with the case in which they are manually combined together. Furthermore, even if the guard panel supplying point is shifted to some extent, the guard panel can be positively positioned so as to be combined with the upper half case. Thus, the assembling operation of the apparatus is highly reliable.

According to the invention, the axis of rotation of the guard panel 1 coincides with the axis of rotation of the pushing means. Therefore, when the guard panel 1 is swung, the guard panel 1 will never be rubbed by the pushing means. Accordingly, a magnetic tape cassette having a fine external appearance can be assembled. Furthermore, the assembling apparatus of the invention is so designed that the pushing means pushes the part (corner 4a) of the guard panel 1 which is relatively high in mechanical strength. Therefore, the guard panel 1 will never be broken or damaged by the pushing means, and the guard panel 1 and the upper half case 6 can be quickly assembled together.

What is claimed is:

1. A method of assembling a magnetic tape cassette comprising a substantially L-shaped guard panel which has first and second supporting shafts formed respectively at both end pieces thereof and is adapted to cover an opening formed in the front longitudinal part of said magnetic tape cassette, said first and second supporting shafts being inserted respectively into a first hole formed in the upper half case and a second hole formed by the upper and lower half cases, said method comprising the steps of:
   positioning said guard panel in front of a front, longitudinal part of said upper half case and inclined with respect to said front part of said upper half case substantially in the same plane in such a manner that said first supporting shaft is set beside said first hole while said second supporting shaft is positioned forwardly of said upper half case;
   moving at least one of said guard panel and said upper half case in a longitudinal direction of said upper half case so that pushing means regulates the position of said guard panel to cause said first supporting shaft to confront with said first hole; and
   swinging said guard panel by said pushing means so that said second supporting shaft engages with said second hole while said first supporting shaft is inserted into said first hole.

2. A method as claimed in claim 1, wherein an axis of rotation of swinging of said pushing means coincides with a corner of said end piece of said guard panel which has said first supporting shaft.

3. An apparatus for assembling a magnetic tape cassette comprising a substantially L-shaped guard panel which has first and second supporting shafts formed respectively at both end pieces thereof and is adapted to cover an opening formed in a front, longitudinal part of said magnetic tape cassette, said first and second supporting shafts being inserted respectivly into a first hole formed in an upper half case and a second hole formed by said upper half case and a lower half case, said apparatus comprising:
- a first table for holding said upper half case;
- a second table for holding said guard panel, said first table and a surface of said second table for holding said guard panel being adjacent to each other substantially in the same plane; and
- pushing means rotatably included on said second table having for embracing at least a corner of said guard panel which confronts with said first hole and having regulating surfaces which are inclined at predetermined angles with respect to a longitudinal direction of said upper half case;
- at least one of said first table and said second table being movable in parallel with said longitudinal direction of said upper half case;

wherein, after said at least one of said first table and said secod table is moved to allow said first supporting shaft to confront with said first hole, said pushing means is turnable while pushing said guard panel, to combine said guard panel with said upper half case.

4. An apparatus as claimed in claim 3, wherein an axis of rotation of said pushing means coincides with a corner of said guard panel after said at least one table has been moved.

5. An apparatus as claimed in claim 4, wherein said pushing means comprises a plate number adapted to slide on said second table while holding said guard panel.

6. An apparatus as claimed in claim 3, wherein said pushing means comprises a plate member adapted to slide on said second table while holding said guard panel.

* * * * *